US008629368B2

(12) United States Patent
Mazumder et al.

(10) Patent No.: US 8,629,368 B2
(45) Date of Patent: Jan. 14, 2014

(54) HIGH-SPEED, ULTRA PRECISION MANUFACTURING STATION THAT COMBINES DIRECT METAL DEPOSITION AND EDM

(75) Inventors: Jyoti Mazumder, Ann Arbor, MI (US); Jun Ni, Ann Arbor, MI (US); Albert Shih, Ann Arbor, MI (US)

(73) Assignee: DM3D Technology, LLC, Troy, MI (US)

( * ) Notice: Subject to any disclaimer, the term of this patent is extended or adjusted under 35 U.S.C. 154(b) by 1627 days.

(21) Appl. No.: 11/668,752

(22) Filed: Jan. 30, 2007

(65) Prior Publication Data

US 2007/0205184 A1 Sep. 6, 2007

Related U.S. Application Data

(60) Provisional application No. 60/763,418, filed on Jan. 30, 2006.

(51) Int. Cl.
*B23H 9/00* (2006.01)
*C23C 14/28* (2006.01)
*C23C 26/02* (2006.01)
*G06F 19/00* (2011.01)

(52) U.S. Cl.
USPC .............. 219/69.14; 219/121.63; 219/121.64; 700/119

(58) Field of Classification Search
USPC ......... 700/119, 166; 219/69.15, 69.16, 69.14, 219/121.63, 121.65
See application file for complete search history.

(56) References Cited

U.S. PATENT DOCUMENTS

| 2,427,588 | A | * | 9/1947 | Burnett ..................... 219/69.15 |
| 4,323,756 | A | | 4/1982 | Brown et al. |
| 4,422,732 | A | * | 12/1983 | Ditzik ........................... 359/315 |
| 4,564,912 | A | * | 1/1986 | Schwefel ................... 219/69.16 |
| 4,661,370 | A | * | 4/1987 | Tarrant ........................... 427/540 |
| 4,724,299 | A | | 2/1988 | Hammeke |
| 4,924,052 | A | * | 5/1990 | Beckley et al. ................. 219/75 |
| 5,780,806 | A | * | 7/1998 | Ferguson et al. ........ 219/121.68 |
| 5,837,960 | A | | 11/1998 | Lewis et al. |

(Continued)

FOREIGN PATENT DOCUMENTS

JP   2002-273625 A   * 9/2002
WO   WO-2005/053895 A1 * 6/2005

OTHER PUBLICATIONS

Computer translation of Japan Patent No. 2002-273,625, published Mar. 16, 2009.*
Human translation of Japan Patent No. 2002-273,625, Jun. 2010.*

*Primary Examiner* — Geoffrey S Evans
(74) *Attorney, Agent, or Firm* — Warner Norcross & Judd LLP

(57) ABSTRACT

A direct-metal deposition (DMD) processing stage and a 5DOF (degree of freedom) dry micro-EDM (mEDM) stage are integrated to provide the submicron scale resolution necessary for the ultra-precision processing of work pieces. The DMD processing stage includes optical feedback for dimensional control utilizing a high-power, fiber-coupled diode laser with fast response time and small beam parameter product. The electrical discharge machining (EDM) stage is a dry EDM stage using an inert gas with appropriate dielectric properties to perform the surface finishing operations. The system further includes one or more surface treatment operations to obtain a desired level of surface hardness or wear resistance and/or to minimize the distortion induced in treating the surface.

1 Claim, 2 Drawing Sheets

(56) References Cited

U.S. PATENT DOCUMENTS

| | | |
|---|---|---|
| 5,914,054 A * | 6/1999 | Ito et al. .................. 219/69.14 |
| 6,122,564 A | 9/2000 | Koch et al. |
| 6,296,549 B1 * | 10/2001 | Dickerson et al. .............. 451/28 |
| 6,534,745 B1 | 3/2003 | Lowney |
| 6,811,744 B2 * | 11/2004 | Keicher et al. .................... 419/5 |
| 2002/0065573 A1 * | 5/2002 | Mazumder et al. ........... 700/166 |
| 2002/0147521 A1 * | 10/2002 | Mok et al. ..................... 700/119 |
| 2005/0127042 A1 * | 6/2005 | Hastilow et al. .......... 219/69.15 |

* cited by examiner

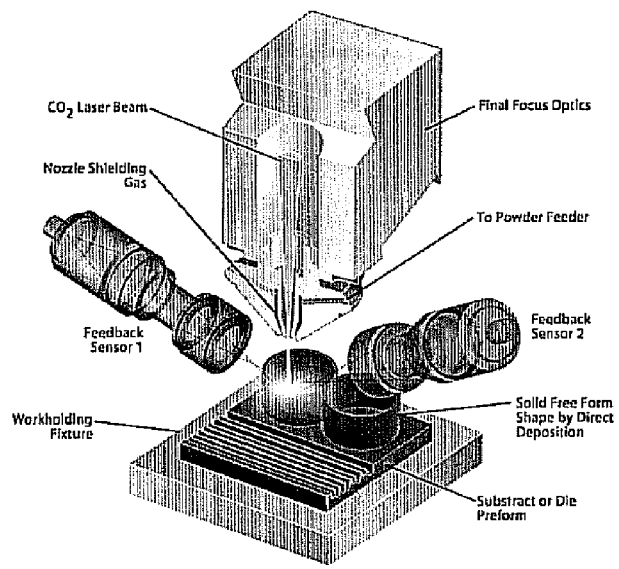
FIGURE 1
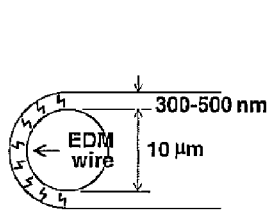 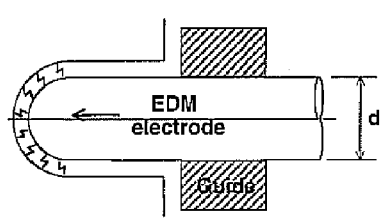 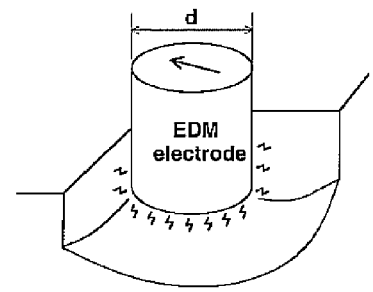
FIGURE 2A          FIGURE 2B          FIGURE 2C

HIGH-SPEED, ULTRA PRECISION MANUFACTURING STATION THAT COMBINES DIRECT METAL DEPOSITION AND EDM

REFERENCE TO RELATED APPLICATION

This application claims priority from U.S. Provisional Patent Application Ser. No. 60/763,418, filed Jan. 30, 2006, the entire content of which is incorporated herein by reference.

FIELD OF TEE INVENTION

This invention relates generally to rapid prototyping and, in particular, to a high-throughput manufacturing station that integrates high-speed, ultra-precision direct metal deposition (DMD) and electrical discharge machining (EDM) for complex tool and die manufacturing with unique and controlled mechanical properties.

BACKGROUND OF THE INVENTION

Laser DMD

Direct-metal Deposition (DM) is a multi-layer metal cladding process where a fully dense clad layer is produced pixel by pixel by melting metal powder with a laser beam. Though a side-to-side laser and powder supply may be used, a concentric nozzle is preferably used. Relative position of the beam and the substrate is determined by computer numeric control with the instruction from a CAD/CAM software. Any three-dimensional shape can be fabricated directly from CAD/CAM data. This process can create parts by focusing an industrial laser onto a flat metal work piece or any geometric surface to create a molten pool of metal. A small stream of powdered metal is then injected into the melt pool to increase the size of the molten pool. In this process, the molten pool produced by the focused laser beam cools and solidifies, resulting in metal parts of superior quality and strength. By moving the laser beam back and forth and tracing out a pattern determined by CAD, the solid metal part is built—line by line, one layer at a time. Unlike traditional subtractive manufacturing processes for producing molds, the DMD process does not produce engineered scrap.

FIG. 1 is sketch of a closed-loop Direct Metal Deposition System. Surface finish on the order of 100 micron is possible. The closed-loop DMD process ensures close dimensional tolerance and enables fabrication of components with multiple materials. It can reduce the present 65-step hip joint fabrication process into 7 steps leading to enormous savings in labor cost and lead-time. DMD can be adapted directly to the digital data from MRI and X-ray Topography.

Breinan and Kear first reported fabrication of three-dimensional metallic components via layer by layer laser cladding in 1978 and subsequently a patent was issued to Brown et. al. in 1982. Recently, various groups are working world wide on different types of layered manufacturing techniques for fabrication of near net-shape metallic components. Integration of lasers with presently available multi-axis CNC machines and co-axial nozzle are the main innovation for fabrication of 3-Dimensional components.

Direct metal freeform fabrication has the ability to create full functional parts from metal powder. Closed-loop DMD provides advantages over existing solid freeform fabrication technologies. Closed loop optical feedback enables automatic fabrication of 3-dimensional parts without operator intervention, ensures consistent product quality and builds to a near net-shape accuracy of 0.007"-0.010".

Since DMD collects the light from the interaction zone and uses it as a feedback to control laser power and other process parameters, the process can control the energy input into the process, dimensions, and the cooling rate. Consequently, the resulting part microstructure can be closely controlled.

Moreover careful control of the input laser energy and process parameters based on the optical signal from the process not only minimizes the energy input but also minimizes vaporization of metals and powder consumption. This results in a more environmentally friendly manufacturing process. The potential for developing novel industrial applications of DMD is currently limitless. Many groups are actively pursuing it commercially for direct fabrication of molds and dies, and the repair of these parts. Recently, DMD has been used to fabricate lightweight, high-stiffness titanium scaffolds for bio-medical applications. To date, directed material deposition processes have been used to fabricate fully functional metal prototype parts, fabricate and repair industrial tooling for plastic injection molding, die casting and forging, and to apply wear resistant and corrosion resistant surfaces to turbine blades.

Micro EDM

In the past decade, electrical discharge machining (EDM) technology has gradually evolved and become an important production process. The EDM can be categorized into two general configurations: wire and die-sinking EDM. The wire EDM process uses a traveling wire as the electrode to cut a groove in a workpiece. Continuous electrical sparks are generated between the wire and workpiece to remove the workmaterial. By using computer-controlled motors and precision slides, the thin wire electrode is guided in the X and Y directions to cut a precise, narrow groove in the workpiece. To manufacture cylindrical parts, an additional axis is added to rotate the workpiece. The diameter of the conventional EDM wire is 250 µm. The state-of-the-art micro wire EDM machine uses 25 µm diameter wires and current research efforts are pursuing the 10 µm diameter wire for EDM FIG. 2(a)).

The second configuration of EDM is the die-sinking. Instead of using a traveling wire, a electrode of any geometry can be used to "drill" unique geometries into the work piece as illustrated in FIG. 2(b). A unique capability of the die-sinking EDM process stems from the ability to move the electrode around the workpiece, like a milling tool, to erode the material and generate the desired geometry (FIG. 2(c)). The EDM cutting force is small and, therefore, the size of EDM electrode as well as the features generated can be very small, in the 20 to 100 µm range.

An extensive technological survey has been undertaken to determine the advances of the critical areas of the EDM technology in order to identify the technology drivers that will enable the development of the ultra precision, nano-scale dry EDM surface finishing process critical to the development of the net-shape tool manufacturing process. Research efforts to enhance and extend the EDM technology base include the improvement in EDM efficiency and surface finish by implementing the nano-scale spark erosion process and the development of dry or near-dry processing techniques. Luo has developed a model to study the random mobility of electrical sparks and concluded that the small gap size allows strong spark mobility. This model indicates the trend of. Kunieda et al. have been active in the research into the high precision finish cutting utilizing the dry wire EDM process.

The Panasonic MG-ED82W Micro-EDM station represents the state of the art in commercially available mEDM technology. The MG-EDS2W is a 3DOF die-sinking EDM system with an integrated cylindrical wire EDM station for the manufacture of micro-electrodes used by the die-sinking machining stage. Panasonic quotes the positioning accuracy of the MG-ED82W as 5 μm across 100 mm XY motion and indicates a maximum surface roughness, $R_{max}$, of 0.1 μm when utilizing de-ionized water as the dielectric material and severely limiting the electrical discharge energy, or spark energy.

Thermal Error Compensation Technologies

Since 1991, breakthroughs have also been made in the area of thermal volumetric (planar) error compensation for machining and turning centers at the University of Michigan. The techniques have been applied to several different kinds of CNC machine tools. Experimental results show that the accuracy improvement is five to 10 times by instrument inspection, and three to five times from cutting tests.

Determining how many thermal sensors should be used and determining their optimum positions are two crucial problems in improving the accuracy and robustness of the thermal error component models. A statistical approach has been used for selecting better sensor locations in preliminary research. However, in a purely statistical approach, a large quantity of sensors and intensive experiments are needed. The concept of the optimization of the sensor location means that, if the sensors are put on these locations, then the fitted thermal error model will be most robust. In other words, the thermal error estimated using this model will give smaller estimation error under various working conditions. This concept is difficult to be represented mathematically since error modeling is involved. In this research a new criterion for the optimization of the thermal sensor location is presented. This criterion is based on the concept that if a good model can be fitted for different working conditions, then the relationship between the thermal errors and sensor temperatures should be uniform or near uniform for various working conditions.

FIG. 3 illustrates a typical sensor temperature-thermal error relation with one sensor. The two curves are related to two operation conditions, warm-up and cool-down, respectively. It is not a good sensor location because a single model cannot estimate the thermal errors of the two conditions accurately because the two error curves are not uniform.

SUMMARY OF THE INVENTION

This invention resides in the integration of multiple, advanced processing technologies into a single, parallel manufacturing station to create finished work pieces in a single environment. The preferred embodiment incorporates a diode-laser-based direct-metal deposition (DMD) processing stage, an innovative 5DOF (degree of freedom) dry micro-EDM (mEDM) technology, a thermal error compensation system for ultra precision processing, and a system platform enables the integration of the DMD and mEDM technologies into a single processing stage. The machine system platform also incorporates key advances that enables both rapid transfer between system processes and submicron scale resolution necessary for the ultra-precision processing of the work pieces.

Innovations made possible by the invention include: (1) The development of a high-power fiber-coupled diode laser with fast response time and small beam parameter product. The state of the art fiber-coupled diode laser with an acceptable beam parameter product of 95 mm-mrad or less has a maximum power of 1 KW. The requirement for a precision Direct Metal Deposition process dictates an output power of 4 KW. (2) The closed-loop feedback precision control of the process parameters (diode laser power and pulse duration, feed speed, powder deposition rate, etc.) to produce a desired near net-shape dimension and metallurgical properties. This requires the quantitative understanding of the relationship between these independent process parameters and the resulting dimension, cooling rate, microstructure and mechanical properties of the produced part. (3) The robust control of the spray/laser nozzle position and orientation in the presence of thermal disturbances due to environment, internal heat generated by servo motors and drive systems, and radiation from the hot metal part being formed. This is the key to meeting the requirement of ultra precision part dimensional quality. (4) The development of an integrated secondary post-processing method for obtaining a super-finished die surface with the required hardness and wear resistance. This is imperative to produce the required surface finish and surface treatment without removing the part from the station. (5) The hardware and software development to integrate the above key enabling technologies into a commercially viable demonstration machine.

The invention yields dramatic increases in material deposition rate, precision and flexibility, together with the greater efficiency and reduced footprint of the fiber coupled diode laser power source. Taken together, these advances enable "mobile die repair," a solution that brings the repair equipment to the die, thereby minimizing costly production downtime and avoiding die transportation time and cost. These advances further enable the introduction of Rapid, Ultra-precision Direct Metal Deposition to a high-volume manufacturing environment, one that requires compact and flexible automation solutions. Applications already exist for deposition of wear resistant alloys to automotive engine and drive train, and power generation components. The technology could revolutionize prosthetic implants industry by improving joint life and bone in-growth, and enabling the economical customization of implants to patient physiology.

BRIEF DESCRIPTION OF THE DRAWINGS

FIG. 1 shows a closed-Loop Direct Metal Deposition (DMD) process of the present invention FIGS. 2A, 2B and 2C show schematic illustrations of die-sinking EDM;

DETAILED DESCRIPTION OF THE INVENTION

This invention broadly integrates technologies to rapidly and directly build functional metal parts, tooling and dies with ultra high precision in a single set up. The process replaces many steps and complex processes in traditional tooling and die manufacturing. The systems and methods offer the advantage of greatly reducing the time to produce complex tooling and dies with ultra high precision, while simultaneously achieving superior tool life and productivity.

The invention integrates various innovations to provide the following three basic functions:

(1) Net-Shape Direct Metal Deposition (DMD): metal alloys can be precisely formed to net-shapes by directly depositing fine metal powders into a melt pool generated by a laser on a substrate material.

(2) Dry Electric-Discharging Machining (EDM) for Super-Finishing Complex Surfaces: instead of using dielectric liquid as processing media in conventional electric-discharge machining, inert gas with the proper dielectric property is proposed in EDM super-finishing process. This allows this surface finishing operation to be easily integrated with the direct metal deposition process.

(3) Innovative Surface Modifications: proper surface treatment is required to obtain the desired surface hardness and wear resistance. The challenge is to also minimize the surface distortion induced in treating the surface.

The invention extends existing state-of-the-art layered manufacturing techniques, and combines them with new process modeling, closed-loop feedback control, and new surface finishing and treatment techniques aimed at integrating machine control with physics models.

(1) Laser DMD Technology:

Fast Response with Optical Feedback

Presently most of the DMD system utilizes either high power $CO_2$ laser or Nd-YAG laser. Closed-loop control using the optical feedback response partly depends on the laser pumping mechanism and its response to the signal from the feedback loop. For $CO_2$ laser, response time is influenced by the relaxation behavior of the gas medium and excitation mechanism such as Radio Frequency (RF) or Direct Current. Carbon Dioxide and Nitrogen gases in a Carbon Dioxide laser hardly respond to a signal above 25 kHz, and above 5 KHz response is rather sluggish. Diode lasers, being semiconductor devices, are almost instantaneously responsive to the electrical input. Therefore, a DMD system driven by a diode laser will provide much faster response compared to $CO_2$ and Nd-YAG laser. Since the diode lasers can respond to signals at a rate up to 20 KHz, the laser power can be finely tuned to the process at faster rate than that by $CO_2$ or YAG lasers and thus the deposition height. The faster response provides enhanced dimensional control and capability to produce intricate components with better dimensional accuracy.

Figure 3:
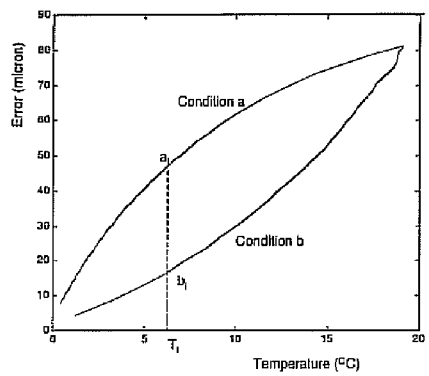
FIG. 3 shows criteria for the optimization of thermal sensor locations.
Figure 4:
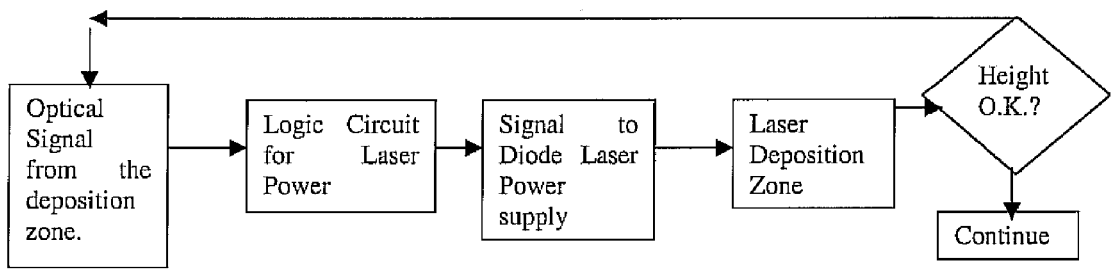
FIG. 4 shows an optical feedback control for diode laser based DMD.

Dimensional accuracy is further improved through proper nozzle design with better powder focusing characteristics, powder utilization and shielding. A newly designed nozzle U.S. Pat. No. 6,534,745] achieves the above-mentioned improvements. The height of the deposition is controlled by an optical feedback loop as described in the U.S. Pat. No. 6,122,564. Projecting the image on a linear array detector and continuously counting the illuminated pixels can monitor the width of the deposit. The same result can also be obtained by monitoring the video signal used for the visual inspection of the process. However, one of the main deposit control parameters is to use the optical signals to control the power of the laser. Thus, the speed of response of the laser power is a variable for the control of the deposit dimension. FIG. 4 shows the flow chart for the optical feedback control loop for the diode laser based DMD system.

(2) Innovations in EDM Technology:

This section of the description details the development of major innovations in the state of the art EDM process technology according to the invention. Specifically, this aspect is directed to an advanced dry-EDM ultra precision finishing technology incorporating major breakthroughs in the fundamental areas of the EDM technology including dielectric materials/fluid, spark length control and spark energy, electrode geometry and many others.

Dry-EDM Finish Cutting Through Nano-Scale Spark Erosion:

Process parameters are optimized to achieve the nano-scale surface roughness required by the finishing stage of the proposed ultra precision DMD-mEDM manufacturing technology. The choice of dielectric material is critical to the overall control of the spark erosion process as its properties contribute to determine the strength and size of the spark generated by various electric potential fields across the dielectric. Based on a detailed investigation of the process parameters and various dielectrics, the optimal solution to the dry-EDM ultra precision finish cutting will be determined. Further to this the operational space of the innovative dry-EDM finishing will be characterized.

Ultra Precision 5DOF mEDM Machining System:

A critical factor in controlling the resultant surface finish of the EDM process is the spark gap, the distance between the workpiece and the electrode. If the spark gap is too large, a larger electric potential is required to develop the electric spark and therefore the resultant spark has significantly higher energy content. Higher energy sparks have a severe impact on the resultant surface finish of the workpiece since they create not only larger craters but also a greater recast layer since more of the work piece is vaporized consequently recast around the spark crater. At the sub-micron length scales of the proposed nano-scale spark erosion process, the resultant surface finish of the work piece is highly sensitive to variations in the spark length. The spark length is affected by the positioning of the electrode relative to the workpiece and the electrode wear rate.

In the traditional 2½D EDM machining process the relative distance between the workpiece and the electrode can be controlled with the required precision using standard 3DOF positioning systems. The DMD-mEDM technology is a 3D technology capable of manufacturing the complex surfaces of the metal tooling such as molds and dies. Traditional 3DOF position systems are unable to control the spark gap to within the required sub-micron limits when operating in completely 3D work piece topography due to the differential gradients of the surface. Consider the surface shown in FIG. 5. The 3DOF positioning system attempts to conform to the geometry of the surface by controlling the position in the two linear axes, X and Z. However the spark gap must be controlled in the normal plane to the surface which is constantly varying along the curve and as a result a spark generation error is incurred. When the gradient becomes too steep the shortest distance from the electrode to the workpiece is no longer in the normal plane to the surface and the spark is generated along a new path represented by $OP_2$ in FIG. 5. The intended spark at this stage in the surface machining should however lie in the normal plane as shown by $OP_1$. As a result the point $P_1$ on the workpiece surface is missed by the EDM finishing process, whilst the surface is in fact eroded twice at point $P_2$. Consequently the 3DOF controllers will result in areas of the surface that are not processed whilst other areas will be processed twice. The resultant non deterministic control of the spark position by 3DOF controller results in unacceptable variations in the surface finish of the workpiece resulting from both the variance in the spark gap which affects the energy imparted during the erosion process and the inherent non-processed areas on the surface.

Figure 5:
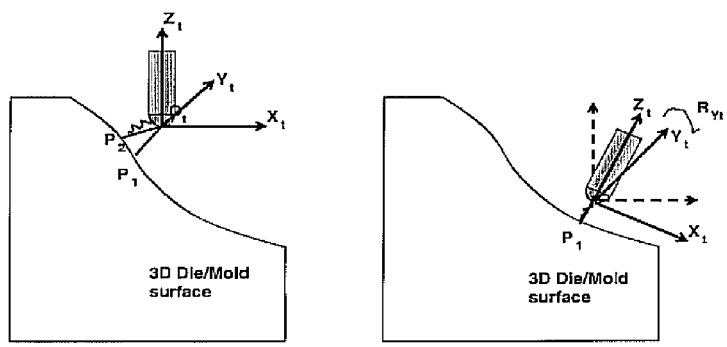
FIG. 5 shows a schematic 5DOF mEDM Axis Control.

An innovative 5DOF controller according to the invention enables the electrode orientation to conform to the normal vector of the work piece surface and provide for precise control of the spark gap and resultant spark position. As shown in FIG. 5, the innovative 5DOF controller will enable the electrode to rotate about the Y axis ($R_y$ pitch) and enable the spark generation within the normal plane. The resultant spark will be developed along the intended path, $OP_1$. The 5DOF controller will enable true determinism in the control of the spark erosion point since the shortest path to the workpiece will always be constrained to the normal vector to the surface at that point.

High Precision Electrode Gap Feedback System:

An innovative feedback system enables the 5DOF controller to compensate for the wear of the electrode that is inherent in the EDM process. Based on the precise, real-time monitoring of the electrode length, compensation algorithms can be implemented to accurately control the spark gap to within the necessary sub-micron limits. Advanced sensors will be incorporated in the mEDM processing stage that will provide high precision feedback information of the electrode wear and distance from the surface. Optimal tuning of the controller parameters will be determined.

(3) Innovations in Thermal Error Compensation:

Thermal Error Mode Analysis:

According to this invention, the thermal error of the DMD-mEDM machine is treated as the superposition of a series of thermal error modes, with corresponding mode shapes and time constants. The idea is to mimic the analysis of forced vibration, which can be viewed as the superposition of a series of vibration modes with different weights. Although the concept is similar to the analysis of forced vibration, there is a significant difference between them. The vibration is a harmonic motion, but thermal deformation is a slow and monotonous procedure.

A new thermal error mode analysis method is preferably used. According to this method, the machine or machine components will be excited by dynamic heat flux, and the thermal deformation will be obtained by the FEA method. Then mathematical treatment will be conducted to obtain the basic thermal error modes. Principal component analysis and/or single value decomposition will be used for this purpose. Through thermal error mode analysis, the properties of the thermal error can be better understood and optimal sensor locations can be identified. Once the optimal sensor positions have been identified, robust models can be developed to compensate for the resultant spray/nozzle position and orientation errors based on the temperature feedback.

Laser Net Shape Direct Metal Deposition Process Advancements

The major challenge for net shape deposition within ±50 µm of the prescribed dimension by DMD process at high deposition rate are as follows:

1) Fast response of the optical feedback system for accurate deposit dimension.
2) Minimization of distortion from thermal and residual stresses In-Situ process control Optimal Process Parameters for Net Shape DMD DMD is a multi variable process. Initially, fractional factorial design will be employed to develop the optimum operating region. Within the optimum operating regions physics of the process and quantitative relationship between the dependent and independent parameters will be explored thoroughly. The response surface relationship from the statistically designed experiments will be used to develop the feedback strategy for the process control to get the net shape with ±50 µm, so that it is ready for the micro-EDM.

Fast Response of Tire Feedback System

Fast response feedback will be achieved using two CCD/dual-color cameras, feeding video signal of weld pool image to a video processing card and software. The feed signal is processed in the video processing software and new process variables are determined. The new values are transferred to the CNC/PMC memory from video processing software through a interface driver. Once the value resides in CNC/PMC memory, it gets transferred to the process equipments, which in turn affects the weld pool image size and hence forming a fast response closed loop feedback system.

Control of Residual Stress During DMD Process

For ferrous materials such as tool steels, the accumulation of residual stress during the manufacturing process often leads to severe distortion or failure. Periodic heat treatment is the easiest solution. However, on-line corrective measure similar to the optical feedback loop would further improve productivity and form another building block for closed loop production process. In this task, we will determine the methods to minimize the residual stress by performing statistically designed experiments as described below:

i) Reheat Pass by Laser at Reduced Speed and Power, Maintaining Temperature Below Melting Point.

In DMD programming, a dry pass after every deposition path can be incorporated to reheat the deposit to cause stress relief, and to minimize distortion and crack initiation. Laser heat treatment is a proven process and integration with the DMD process architecture will improve the efficiency of DMD for many materials. The temperature cycle needed for phase change will follow a similar time-temperature trend for conventional materials, but the time would be reduced since diffusive reactions will use shorter paths due to the fine grain structure associated with the laser.

ii) In-Situ Resistive Heating

Periodic resistive heating can be administered by a wrap-around heating element for post-DMD stress relief without removing the component. Conceptually, multiple parts can be placed on carousel under the laser beam. Heat treatment can be carried out on a component after deposition of a predetermined number of layers, while another part is being deposited at the same time. Carousel will periodically exchange parts for deposition and heat treatment, but no re-indexing will be necessary since the part is kept on its original fixture.

iii) In-Situ Inductive Heating

A shaped electrode will be used to heat treat each deposited layer to minimize residual stress accumulation. The frequency of the induction heater can be varied to control the depth of the heat treatment.

iv) Sub-Harmonic Vibration:

Sub-harmonic vibration during the process can also be used to affect the residual stress. Frequency of vibration determines the magnitude of the stress accumulation. Commercial equipment from Bonal technology, with Trade name of Metalax, was used for initial experiments. In a closed-loop DMD process, sub-harmonic vibration can also be incorporated to tale corrective measures during the process. A wireless sensor will be mounted to determine the magnitude of the accumulated stress before any corrective measure is applied.

v) Different Contouring Path (Tool Path):

Preliminary experiments show that the contouring path affects the stress accumulation. Higher power is helpful in reducing the residual stresses, which is evident from preliminary work. The effect of the tool path seems to depend on the level of power. A Zigzag tool path has produced slightly better results in terms of minimization of stresses, whereas at power level 1200 W, a spiral setup performed better. Thus, power and yool path is interacting with one another. When interaction is evident, no definitive conclusion may be made on the individual effect of the factors. However, based on experimental data, a look-up table can be incorporated as part of the DMD process to adjust the tool path to suit the need.

vi) Increased Powder Mass Flow

Mass flow rate has a huge effect on the accumulation of residual stresses in the DIM H13 steel specimen. Preliminary data indicate that a higher mass flow rate produced a specimen with much lower residual stresses in comparison with a low mass flow rate.

vii) Increased Deposit Layer Thickness

Layer thickness has a major effect on the stress. Higher level of layer thickness has produced samples with lower residual stresses. A combination of higher level of layer thickness with low frequency sub-harmonic vibration and spiral mode of tool path setup will be explored to produce the minimum amount of stress in the specimen.

viii) Traverse Speed

Travel speed has a profound effect on the residual stress. A quantitative relationship between the traverse speed and residual stress will be established for process control.

In this system, sensors will continually monitor deposition height, width, temperature and residual stress during the deposition process. A predetermined limit with respect to the yield strength of the material will be set. If the stress exceeds that limit, sensors will automatically introduce one of the above-mentioned remedial measures. Priority of the remedial measures will be set up from a look up table created from prior experimental knowledge.

Some recommended sensors are as follows:
  To control temperature induced distortion and stress, infrared temperature detector will be used and temperature can be reduced using: 1) Increased speed and 2) decreased power
  To monitor 3-D dimension of the deposition, (1) height will be monitored by optical feedback loop, and (2) width by video portion of the feedback loop
  To monitor Crack initiation, acoustic emission, infrared temperature and eddy current methods can be employed.

In-Situ Composition Monitoring and Control

For multi-material DMD, mixing at the interface is critical to determine the strength and properties of the tool. Too much dilution leads to reduction in strength and lack of fusion bond leads to de-lamination. In this task, a system will be developed to continuously monitor the composition based on relative line emission spectroscopy. Spectroscopic analysis will be incorporated into the sensor system through the use of a beam-splitter or partially-transmitting mirror, located upstream of the photo-detector, which directs a portion of the light received from the object to a dispersing element, such as a diffraction grating. The light from the diffraction grating may be collimated by a lens and fed to a detector to output spectral content information along line.

Such spectral content information may be used to passively monitor and/or record data regarding the material composition of the melt-pool or cladding layer as it develops, or may be incorporated into a feedback loop to alter the operation of the system in accordance with material composition. For example, the constituency of the powder feed may be varied in accordance with design criteria and checked through the spectral analysis aspect to ensure that the proper alloy or change in material composition is taking place. Laser power density and traverse speeds are two other variables capable of adjustment on the fly to keep a fixed composition.

Part-Geometry Independent Real Time Closed Loop DMD Melt Pool Temperature Control System for Multi-Layer DMD Process The objective of this task is to maintain the temperature of the weld pool at its constant optimal value at every coordinate of a part, during DMD multi-layer deposition. This will also minimize thermal stress and residual stress variation. The objective will be achieved by controlling the weld pool image size, towards the optimal size, by identifying the local optimal points of the part and adjusting the process variables with point and layer correction factors.

Achieving the result requires high-speed digital video processing of the weld pool image, together with software programming to determine the variation of the observed image from that of the optimal condition. At each successive layer, the control system consults a database of known process parameters and selects the proper combination of process inputs, such as feed rate, powder flow rate and laser power, in order to adjust the process towards the optimal condition.

Sensor Fusion

This ultra precision DMD-mEDM system will have multiple sensors for dimension, stress, temperature and composition control in addition to thermal error. Different control strategies will be warranted for different functions and detectors. In this task software and hardware will be developed to fuse all the various sensors work in harmony and deploy the appropriate sensors and algorithms for the optimum control of the process.

Improved Deposit Accuracy by Nozzle Design

The powder delivery nozzle must provide consistent and accurate control of the metal powder, which has a direct impact on the metallurgical properties, surface finish and efficiency of the process. In this task, minimum powder size distribution conducive to delivery through a nozzle will be determined.

The preferred nozzle utilizes a unique shaping gas flow to deliver powder in a cone shape around the laser beam. This causes the powder density at the melt pool to increase, resulting in an increase in process efficiency or catchment of powder in the melt pool. The efficiency of the DMD nozzle is 44% vs. powder utilization efficiency of 15% for the typical powdered metal deposition nozzle.

The DMD nozzle creates improved surface quality due to the shaping gas concentrating and containing the powder locally to the laser beam diameter that is being utilized. The DMD nozzle has demonstrated accuracies of +0.003"-+0.005" on horizontal surfaces, +0.001"-+0.003" on vertical surfaces and flatness of +0.002". Finer powder will improve the accuracies but it will also require us to overcome the technical barriers for consistent flow of finer powder under a constant pneumatic pressure.

Highs Deposition Rate with High Accuracy

For improved commercial viability, accuracy has to accompany high deposition rate. Target accuracy of 50 μm can be easily achieved with the same deposit layer thickness. That will produce very small deposit volume compared the present 1 inch$^3$/hr with 0.015 inch layer thickness. Using larger deposit layer with wider beam is a must to achieve the goal of 5 inch$^3$/hr deposition rate. However, that will require overcoming the spherical profile due to surface tension effect. Beam shaping optics to create a beam with uniform power density will reduce the surface tension effect, but will pose problem for sensors for the height and dimension. Proper optical train for the video image will be required to control the dimension. In addition overlap pass and finer finishing passes has to be designed for high deposition rate with high accuracy.

DMD Process Specific Alloy Design

Compared with traditional weld overlaying methods, such as, oxy-fuel, TIG, MIG, submerged arc, open arc and plasma transferred arc welding, laser cladding is unique in that the cooling rate of the weld pool metal is much higher and dilution much lower than most of the welding processes. Due to the large heat sink in the substrate, the cooling rate is typically 1,000 C/second, compared with 5-50 C/second for other welding processes. A high cooling rate leads to smaller grain size and phases with extended solid solubility, resulting in significantly different properties from slow-cooled metals. Having fast cooling rates and low dilution levels, laser cladding offers a unique opportunity for designing alloys just for this process to provide solutions to certain industrial material degradation problems.

Ultra Precision 5DOF Day Micro-EDM Process Development

In order to achieve the desired CAD-to-Part capabilities of the proposed DMD-mEDM direct tool manufacturing station, the current state of the art in EDM process technology will need to be significantly extended. The initial research will be focused on assessing the feasibility of dry EDM machining for ultra-precision surface finishing processes required by the proposed net-shape DMD-mEDM manufacturing technology. If the development of a suitable dry-EDM process is determined to be unfeasible within the time frame of the development program, a fallback near-dry EDM process will be developed that utilizes minimum dielectric fluid. Once the critical decision gate has been passed, the optimal parameters of the dry (or wet) EDM process will be researched and determined. A 5DOF EDM machining head allows for the ultra-precision control of the spark length and orientation necessary to guarantee the optimal machining of complex surfaces.

Optimal Process Parameters for Ultra Precision Day EDM Machining.

Initial research will be conducted using state of the art micro-EDM technology in order to advance the scientific understanding of nano-scale spark erosion process for ultra precision EDM machining. Detailed research investigations will be conducted to determine feasibility of dry die-sinking EDM machining for ultra precision finish cutting of complex surfaces. Specific process research will be undertaken in order to characterize the nano-scale spark erosion process using dry, or gaseous, dielectric media, in particular inert gasses such as Argon. As a fall-back position, research will be undertaken to investigate and develop near-dry EDM processes that utilize the minimum amount of non-contaminating dielectric fluids, e.g., de-ionized water. Particular attention will be paid to the characterization of the effect of dielectric flow rate on surface finish in order to determine the range of flow rates of both gas and fluid media required for optimal flushing of the spark erosion zone.

Development of a 5DOF EDM Machining System.

The EDM processing stage incorporates an innovative 5DOF electrode position system that enables the ultra precision machining of complex surfaces by the precision control of the pitch and yaw of the electrode machining head necessary to align the electrode with the normal vector to the surface. The 5DOF positioning system enables the precision contouring of the 3D surface of the tool necessary for the accurate control of the spark length and spark position. The basic configuration of the 5DOF positioning system will be constrained to gantry-type motion systems similar to the DMD technology in order to facilitate the integration of both the EDM and DMD technologies into a single machine station.

Precision Feedback System for Electrode Position and Wear Monitoring

The nano-scale spark erosion process is highly sensitive to variations in the spark gap. An ultra precision feedback system will monitor spark gap with nano-scale accuracy. The precision feedback system may be developed utilizing one, or a combination of suitable technologies in order to optimize the spark-gap feedback system in terms of minimizing the response time and achieving maximum position resolution. Based on the real time spark gap data, electrode wear compensation algorithms can be developed in order to maintain the ultra precision of the nano-scale spark erosion process independent of electrode wear.

Robust Thermal Error Compensation for Adaptive, Ultra Precision Control Thermal Error Mode Analysis Tools.

The thermal error compensation module for the net-shape DMD-mEDM net-shape manufacturing system will focus on advanced thermal error compensation analysis tools. An emphasis is placed on the characterization of the large thermal loads of the laser and the associated melt pool and develop algorithms in order to fully characterize the resultant radiation of heat to the surrounding structure. A challenge is determining, with a sufficient degree of accuracy, the effect of the radiated heat loads to the surrounding structure, in particular the DMD processing head. However, the development is expedited due to the availability of existing CAD data and FEA models of the existing DMD manufacturing systems that are required to predict the thermal deformations of the machine structure that are essential to the thermal error mode analysis. This will also validate the proposed thermal error mode analysis tools on a real world system that incorporates the radiation thermal loads resulting from the laser and melt pool that are inherent to the DMD processing technology.

Optimal Sensor Locations for the DMD-mEDM Machining Station

The most challenging research in the development of the robust thermal error compensation module for the DMD-mEDM net-shape machining technology will be concerned with the optimal selection and placement of the thermal sensors necessary to characterize the thermal distortion errors. The optimal location of the sensors enables the use of linear or nearly linear models to describe the thermal error as a function of the measured temperatures and therefore significantly impacts the robustness of the overall compensation system. The critical questions of how many sensors and where to position them is a key focus.

Sub-Task 4.3—Robust Thermal Error Model for Tire DMD-mEDM Machining station

A robust thermal error model will be developed for the DMD-mEDM processing system that will accurately represent the thermal errors of the system in terms of the monitored temperatures. As a result of the optimal sensor locations determined from Task 4.2, the resultant models for the thermal errors should be linear or near-linear and therefore will require limited tuning and testing calibration data. The optimization of the model parameters to enhance the robustness of the thermal error models will be investigated and developed.

Integrated DMD-mEDM Net-Shape Manufacturing Station

The DMD-mEDM net-shape manufacturing technology integrates the enhancements and breakthroughs achieved in the above three major core technologies detailed herein above. Other advances include the optimization of the base platform for stiffness and precision, the conceptual design and optimization of the topography of the integrated system and the development of a full functionality prototype for validation and demonstration purposes.

Design and Optimize Integrated DMD-mEDM Machining Station

Various configurations of the machine are possible in terms of structural rigidity and stiffness, thermal response and stability, ultra-precision motion stages and overall development cost. Advanced solid modeling tools and FEA tools, including dynamic analyses, will be utilized to develop virtual prototypes of the various design concepts and thereby enable the quantitative assessment of the performance of the individual design concepts.

DMD-mEDM Machining Station Prototype

Detailed mechanical design optimization of the optimal design concept will be performed in order to enhance the stiffness, particularly across part boundaries, and thermal response and stability of the integrated system to minimize position error components. State of the art, ultra precision motion stages will be integrated with the base frame of the design in order to achieve the desired sub-micron positioning resolution. A total system controller will be developed utilizing either PLC or embedded PC control technology to provide for the smooth operation of the entire system and to ensure the coordinated interaction of the independent 5DOF motion controllers of the DMD and mEDM processing stages that is necessary to achieve maximum throughput of the technology. Furthermore the total system controller will include an integrated temperature data acquisition system based on the integration of thermal sensors at the optimal locations on the frame as determined by the innovative thermal error mode analysis and investigation. The total system controller will enable both master-slave and fully independent operation of the two stages thereby enhancing the flexibility of the innovative DMD-mEDM manufacturing technology. Extensive operational testing will be conducted to calibrate the system and to fine-tune the parameters of the motion controller utilizing ultra precision laser interferometers to provide dead reckoning position data. Several specifically designed work pieces will be produced using the integrated DMD-mEDM technology and then subjected to extensive precision metrological analysis in order to determine position control anomalies resulting from the operation of the DMD and mEDM machining stages. Fine-tuning of the controller will be undertaken based on the results of these initial production tests.

Implement and Validate the Complete, Systemic Error Compensation Control Strategy Extensive operational tests of the DMD-mEDM manufacturing technology will be conducted in order to characterize the thermal performance of the system under various thermal loading conditions. Long duration tests will be conducted during which the DMD-mEDM manufacturing system will be cycled through warm-up, operation and cool-down states during which the temperature data collected by the integrated thermal DAQ system will be captured and stored. Operational thermal performance data will be utilized to fine tune the thermal error models needed to describe the numerous thermal error components of the overall system.

The thermal error compensation algorithms based on the tuned thermal error models will be implemented and the performance of the compensated system will be scrutinized. Positioning data will be obtained using ultra precision laser interferometer systems from operational tests using the thermal error compensation model. Based on the new position data, geometric error components resulting from the inherent inaccuracies of the motion systems will be determined. A total, system error compensation system will be developed in order to compensate for all error components either thermal or geometric.

We claim:

1. A high-throughput manufacturing station, comprising in combination:
   a direct-metal deposition (DMD) processing stage for fabricating a component in accordance with a computer-aided design (CAD) description;
   an electrical discharge machining (EDM) stage for performing surface finishing operations on the component, the EDM stage being a 5DOF (degree of freedom) dry EDM stage using an inert gas with appropriate dielectric properties; and
   wherein the DMD processing stage includes a high-power, fiber-coupled diode laser with fast response time and small beam parameter product.

* * * * *